No. 673,326. Patented Apr. 30, 1901.
A. G. PERRY.
SEED PLANTER.
(Application filed Oct. 9, 1900.)
(No Model.) 3 Sheets—Sheet 1.
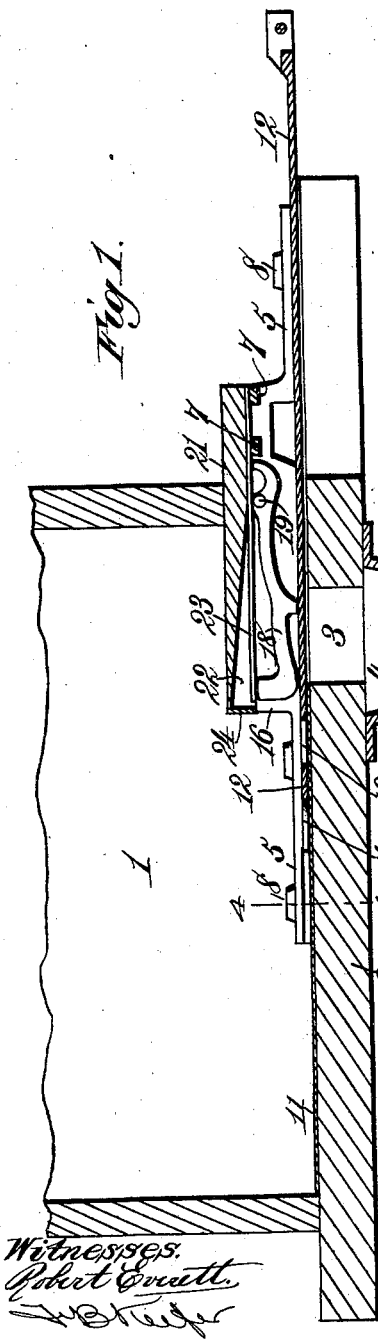
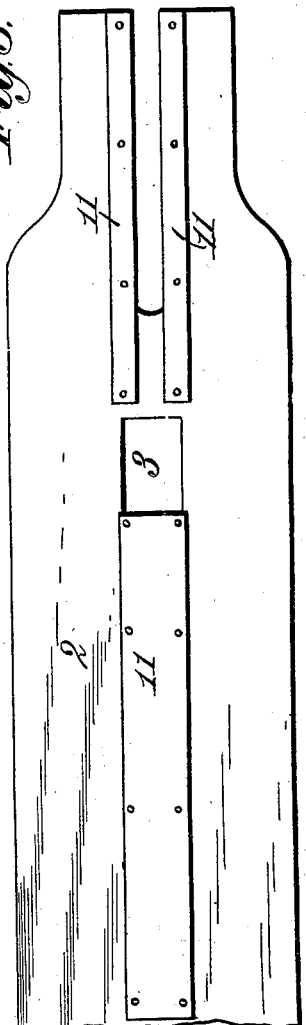
Witnesses.
Robert Everett.
Inventor.
Alvin G. Perry.
By James L. Norris.
Atty.

No. 673,326. Patented Apr. 30, 1901.
A. G. PERRY.
SEED PLANTER.
(Application filed Oct. 9, 1900.)
(No Model.) 3 Sheets—Sheet 2.
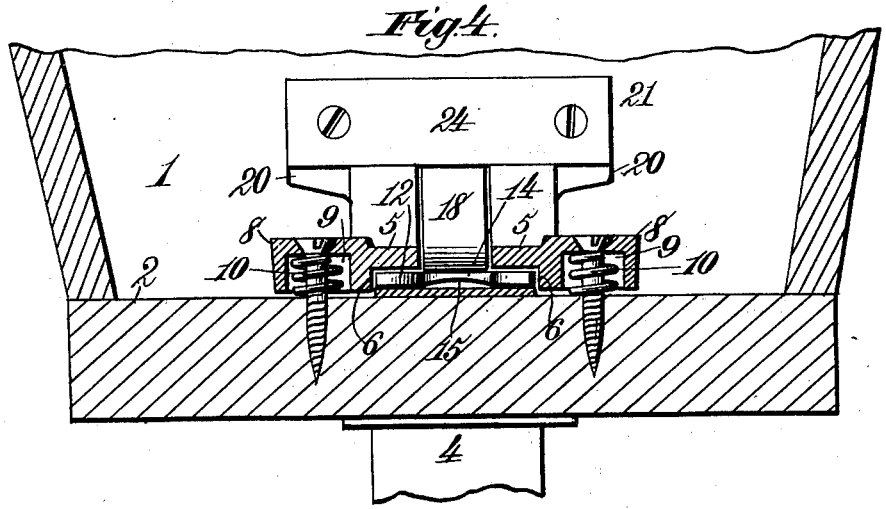
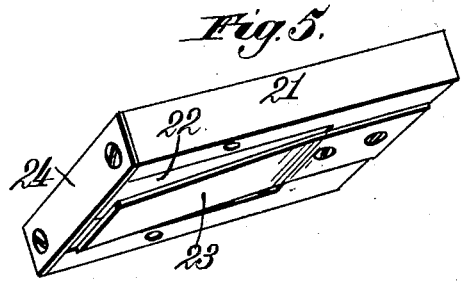
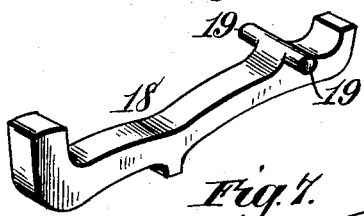
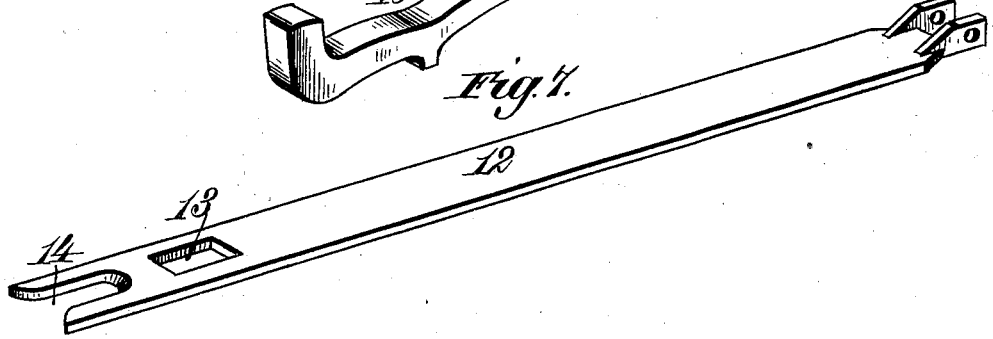
Witnesses.
Robert Everett
F. B. O'Keefe
Inventor.
Alvin G. Perry,
By James L. Norris.
Atty.

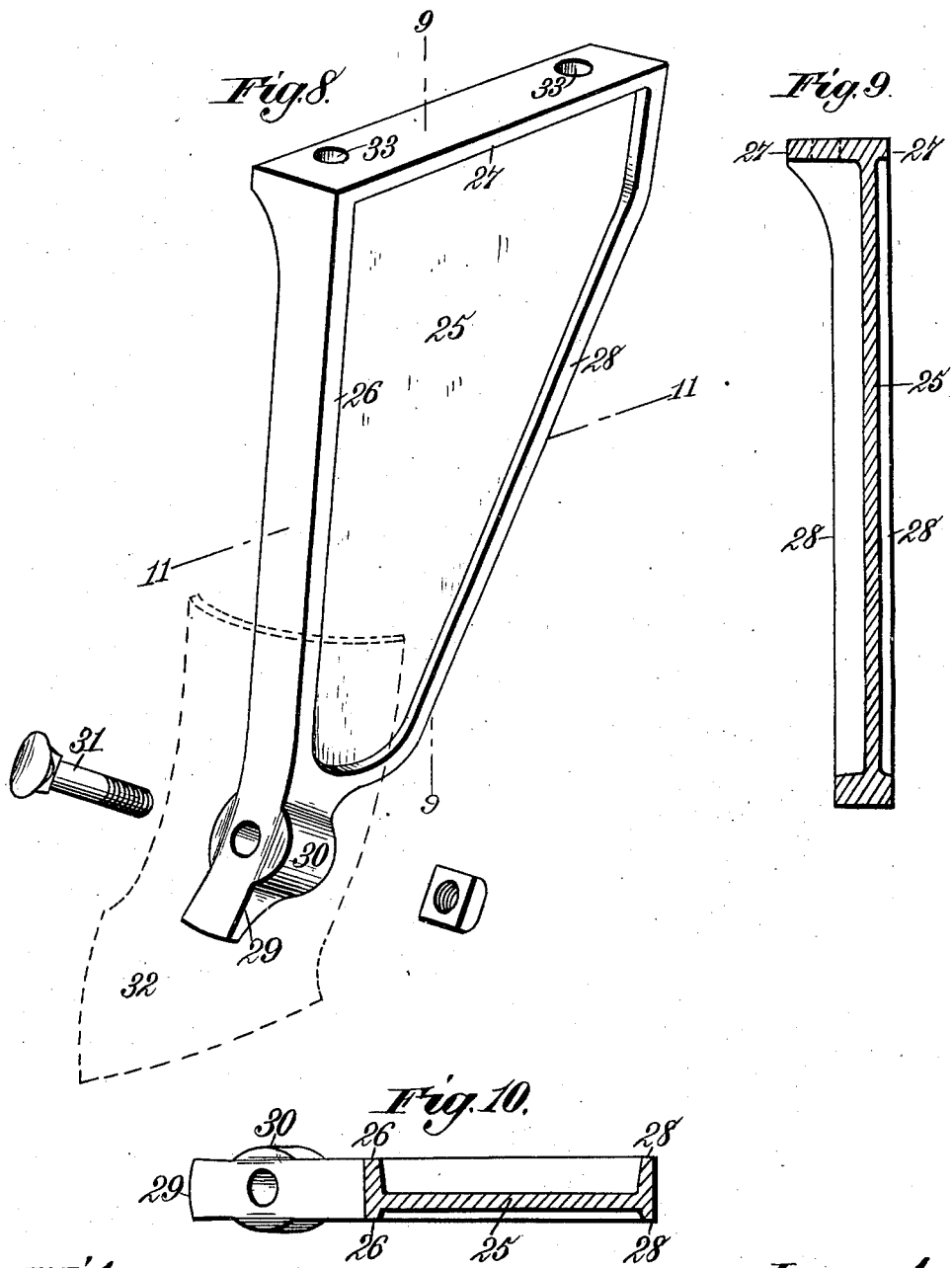

UNITED STATES PATENT OFFICE.

ALVY GREEN PERRY, OF COLDWATER, MISSISSIPPI.

SEED-PLANTER.

SPECIFICATION forming part of Letters Patent No. 673,326, dated April 30, 1901.

Application filed October 9, 1900. Serial No. 32,509. (No model.)

*To all whom it may concern:*

Be it known that I, ALVY GREEN PERRY, a citizen of the United States, residing at Coldwater, in the county of Tate and State of Mississippi, have invented new and useful Improvements in Seed-Planters, of which the following is a specification.

This invention relates to seed-planters for planting corn, cotton, and the like, and has for its objects to improve and simplify the seed-dropping mechanism in such manner that the wear on the operative parts will be reduced to a minimum and to so construct and arrange said parts that interchangeable feed-slides may be conveniently used and quickly slipped into place to adapt the machine to different kinds of seed.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a vertical longitudinal sectional view of a sufficient portion of a seed-planter to illustrate my invention. Fig. 2 is a top plan view thereof, the sides of the hopper being removed. Fig. 3 is a similar view of the bottom of the hopper, showing the base-plates on which the feed-slide reciprocates. Fig. 4 is a transverse sectional view, on an enlarged scale, taken on the line 4 4 of Fig. 1. Fig. 5 is a detail perspective view of the cover-block and spring. Fig. 6 is a similar view of the cut-off, and Fig. 7 is a similar view of the feed-slide. Fig. 8 is a perspective view of one of the standards adapted to be attached to the beam or frame of the planter for carrying a share or shovel. Fig. 9 is a vertical sectional view thereof, taken on the line 9 9 of Fig. 8; and Fig. 10 is a transverse sectional view taken on the line 11 11 of Fig. 8.

Referring to the drawings, the numeral 1 indicates the feed-hopper, in the bottom 2 of which is formed a feed-opening 3. Attached to the under side of the bottom 2 of the hopper, immediately beneath the feed-opening 3, is a feed spout or chute 4, of ordinary and well-known construction, and which operates to convey the seed dropped through the feed-opening 3 to the furrow in the usual manner.

Attached to the upper side of the bottom 2 of the hopper is a feed-slide casing comprising two parallel metallic guide-bars 5, recessed or rabbeted on their inner or adjacent edges to form guideways 6, said guide-bars being rigidly united and held parallel with each other by integral transverse webs or riles 7. Each of the guide-bars 5 is provided on its outer edge with laterally-projecting perforated ears or lugs 8, through which pass screws that secure the casing to the bottom of the hopper, and each of said ears or lugs is countersunk or recessed on its under side, as at 9, for the reception of coiled springs 10, which are disposed about the screws and between the bottom 2 of the hopper and said ears or lugs for the purpose hereinafter explained. Fixed to the upper side of the hopper-bottom 2 and beneath the feed-slide casing are flat metallic bed-plates 11. Arranged to slide in the guideways 6 is a feed-slide 12, consisting of a flat metallic bar that slides on the bed-plates 11 and is guided in its reciprocating movement by the guideways 6. A rectangular feed-opening 13 is formed in said feed-slide near the inner end of the latter, and the extreme inner end of the feed-slide is forked or bifurcated, as at 14, the inner end or wall of the notch or recess 14 being beveled or inclined, as shown and for the purpose hereinafter made apparent. The under side of the feed-slide is centrally and longitudinally grooved, as at 15, whereby only the edges of said slide are in frictional contact with the bed-plates 11, thereby reducing the friction caused by the reciprocation of the feed-slide and also reducing the weight of the latter. The feed-slide may be reciprocated by any of the ordinary driving mechanisms well known to those skilled in the art and which are commonly employed in implements of the type to which this invention relates.

The guide-bars 5 intermediate their ends are enlarged or increased in thickness, as at 16, and in the upper edges of said raised or thickened portions are formed two registering transverse grooves or bearings 17. Disposed between the two raised portions 16 of the guide-bars is a rocking or oscillating cut-off 18, provided with laterally-projecting trunnions 19, that are journaled in the grooves or bearings 17. The inner end of the cut-off 18 is slightly rounded or beveled, as shown, and rests on the upper side of the feed-slide 12 at a point slightly in advance of the feed-opening 3 in the hopper-bottom. The raised portions 16 of the guide-bars are provided at their outer edges with perforated ears or lugs 20, and seated on said raised portions is a cover-block 21, which is secured in place by screws which pass through the perforated ears or lugs 21. The cover-block serves to close the space between the raised portions of the guide-bars and prevents the corn or other seed from dropping down onto and interfering with the operation of the cut-off, and said cover-block is grooved for a portion of its length on its under side, as at 22. To the ungrooved end of the under side of the cover-block is secured one end of a flat or leaf spring 23, the free end of which bears upon the inner end of the cut-off, the groove in the cover-block permitting the free end of the spring to yield upwardly when the inner end of the cut-off is raised. Fixed to the end of the cover-block is a transverse plate 24, which serves to prevent seed from getting in the groove above the opening.

The operation of my improved device is as follows: As the planter is drawn along over the furrows the feed-slide is reciprocated back and forth by any suitable driving mechanism, as before stated. As the feed-slide is moved forward its forked end engages the corn, which is fed down from the hopper between the guide-bars, and turns the grains straight or longitudinally between the forked ends of the feed-slide, so that the grains will fall into the feed-opening 13 with certainty, and as the inner end or wall of the forked end of the feed-slide is beveled, as shown, the latter will pass underneath the grains smoothly and easily, without injury to the corn or other seed. As the slide moves backward it carries with it the grain of corn dropped into the aperture 13, and when said aperture arrives at a point over the feed-opening 3 in the bottom of the hopper the grain of corn drops through said feed-opening into the feed chute or spout 4 and down through the latter into the furrow. It will thus be seen that at each reciprocation of the feed-slide a grain of corn will be dropped into the furrow.

By making the feed-slide concave or grooved on the bottom it lightens the weight of the slide and reduces the surface that contacts with the bearing-plates, thereby reducing the friction on the slide and bearing-plates, and consequently reducing the wear on the same. By yieldingly supporting the feed-slide casing over the feed-slide on coiled springs, as shown and described, the weight of said casing is taken off the slide, preventing undue wear on the latter and the guide-bars, while at the same time said casing will yield vertically to accommodate feed-slides of different thickness. By means of such arrangement interchangeable feed-slides of different thickness to suit different kinds of seed may be employed and may be quickly slipped in and out of place in the feed-slide casing.

In operation the free end of the cut-off readily yields vertically to permit the seed to pass under it, but is held down with a yielding pressure by the leaf-spring to prevent the loose corn in the hopper from working back over the feed-aperture in the bottom of the hopper. The yielding cut-off, however, will not operate to break, crush, or otherwise injure the corn.

I have referred to my improved planter as being particularly adapted to planting corn; but it will be evident that it is well adapted to planting seed of various different kinds.

In Figs. 8 to 10 I have illustrated an improved standard for use in connection with the planter for carrying the shovels, said standard comprising a flat metallic web or plate 25, which gradually decreases in width from its upper toward its lower end, as most clearly shown in Fig. 8 of the drawings. Said web or plate is provided on all sides with laterally-projecting ribs or flanges 26, 27, and 28, that extend on both sides of and at right angles to the web or plate. The lower end of the standard terminates in a solid point 29, the forward edge of which is flush with and forms a continuation of the forward edge or face of the flange 26. The point 29 is provided with a perforated boss 30, through which is adapted to be passed a bolt 31, operating to attach the shovel 32 to the standard in a well-known manner. Bolt-holes 33 are formed in the flange 27 on the top of the standard for the reception of bolts, by means of which the standard is attached to the beam or frame of the planter. By constructing the standard in the manner shown and described great strength is combined with lightness and the standard is enabled to successfully resist not only the direct backward strain occasioned by the draft of the implement and those caused by the shovels encountering roots, stones, and other obstructions, but also the torsional strain or lateral twist exerted on the standard by the shovels.

Having described my invention, what I claim is—

1. In a seed-planter, the combination with the hopper having a feed-opening in its bottom, of a reciprocating apertured feed-slide arranged to slide back and forth over the hopper-bottom and a casing provided with guideways in which said feed-slide reciprocates, said casing straddling and being yieldingly supported over said feed-slide, substantially as described.

2. In a seed-planter, the combination with the hopper having a feed-opening in its bottom, of a reciprocating apertured feed-slide arranged to slide back and forth over the hopper-bottom, a casing provided with guideways in which said feed-slide reciprocates, said casing being provided with laterally-projecting perforated ears or lugs for the passage of fastening-screws for attaching the casing to the bottom of the hopper and countersunk on their under sides and coiled springs disposed between the countersunk ears or lugs and the hopper-bottom and operating to yieldingly support the casing over the feed-slide, substantially as described.

3. In a seed-planter, the combination with the hopper having a feed-opening in the bottom, of flat metallic bed-plates attached to the upper side of the hopper-bottom in front and rear of the feed-opening, and a feed-slide arranged to reciprocate upon said bed-plate over the feed-opening, said feed-slide being longitudinally and centrally grooved on its under side and provided with a feed-opening, substantially as described and for the purpose specified.

4. In a seed-planter, the combination with the hopper having a feed-opening in the bottom, of a feed-slide arranged to reciprocate over said opening, a feed-slide casing comprising two parallel guide-bars straddling said feed-slide and connected to the upper side of the hopper-bottom, a rocking cut-off disposed between the guide-bars and provided at one end with laterally-projecting trunnions journaled in grooves formed in the upper edges of the guide-bars, a cover-block attached to the upper sides of the guide-bars and grooved on its under side, and a flat spring attached at one end to the under side of the cover-block and bearing at its free end on the free end of the cover-block, substantially as described and for the purpose specified.

In testimony whereof I have hereunto set my hand in presence of two subscribing witnesses.

ALVY GREEN PERRY.

Witnesses:
R. A. JACKSON,
W. R. GILLILAND.